(12) United States Patent
Stadelmann

(10) Patent No.: US 6,415,156 B1
(45) Date of Patent: Jul. 2, 2002

(54) TRANSACTION METHOD

(75) Inventor: Anton Niklaus Stadelmann, Bolligen (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 09/392,785

(22) Filed: Sep. 9, 1999

(30) Foreign Application Priority Data

Sep. 10, 1998 (CH) ............................................. 1852/98

(51) Int. Cl.[7] ................................................. H04Q 7/20
(52) U.S. Cl. ........................ 455/466; 455/403; 455/414
(58) Field of Search ................................. 455/466, 403, 455/406, 414, 422, 575; 395/224; 379/58, 60; 340/825.34

(56) References Cited

U.S. PATENT DOCUMENTS

| | | | | |
|---|---|---|---|---|
| 5,243,645 A | * | 9/1993 | Bissell et al. ................ | 379/211 |
| 5,594,789 A | * | 1/1997 | Seazholtz et al. ........... | 379/207 |
| 5,646,945 A | * | 7/1997 | Bergler ........................ | 370/419 |
| 5,719,918 A | * | 2/1998 | Serbetciouglu et al. ....... | 379/58 |
| 5,909,651 A | * | 6/1999 | Chander et al. ............. | 455/466 |
| 5,915,225 A | * | 6/1999 | Mills ............................ | 455/558 |
| 5,920,847 A | * | 7/1999 | Kolling et al. ................ | 705/40 |
| 5,966,697 A | * | 10/1999 | Fergerson et al. ............ | 705/26 |
| 5,999,625 A | * | 12/1999 | Bellare et al. ................. | 380/24 |
| 6,006,098 A | * | 12/1999 | Rathnasabapathy et al. | 455/461 |
| 6,014,636 A | * | 1/2000 | Reeder ......................... | 705/17 |
| 6,029,151 A | * | 2/2000 | Nikander ...................... | 705/39 |
| 6,038,551 A | * | 3/2000 | Barlow et al. ................. | 705/41 |
| 6,067,529 A | * | 5/2000 | Ray et al. ..................... | 705/26 |
| 6,092,133 A | * | 7/2000 | Erola et al. .................. | 710/102 |
| 6,115,601 A | * | 9/2000 | Ferreira ..................... | 455/406 |
| 6,119,000 A | * | 9/2000 | Stephenson et al. ........ | 455/432 |

FOREIGN PATENT DOCUMENTS

| | | | | |
|---|---|---|---|---|
| EP | 689 368 B1 | | 12/1995 | |
| EP | WO 9828900 | * | 7/1998 | ............ H04M/3/50 |
| FI | WO 00/52650 | * | 9/2000 | ............ G07F/7/08 |
| WO | 94/11849 | | 5/1994 | |
| WO | 96/13814 | | 5/1996 | |
| WO | 96/25828 | | 8/1996 | |
| WO | 97/04609 | | 2/1997 | |
| WO | 98/11519 | | 3/1998 | |

* cited by examiner

Primary Examiner—Daniel Hunter
Assistant Examiner—C. Chow
(74) Attorney, Agent, or Firm—Pillsbury Winthrop LLP

(57) ABSTRACT

Transaction method for ordering goods or services by mobile telephone, an order for delivery being transmitted to the services provider via a mobile radio network.

Figure 1:
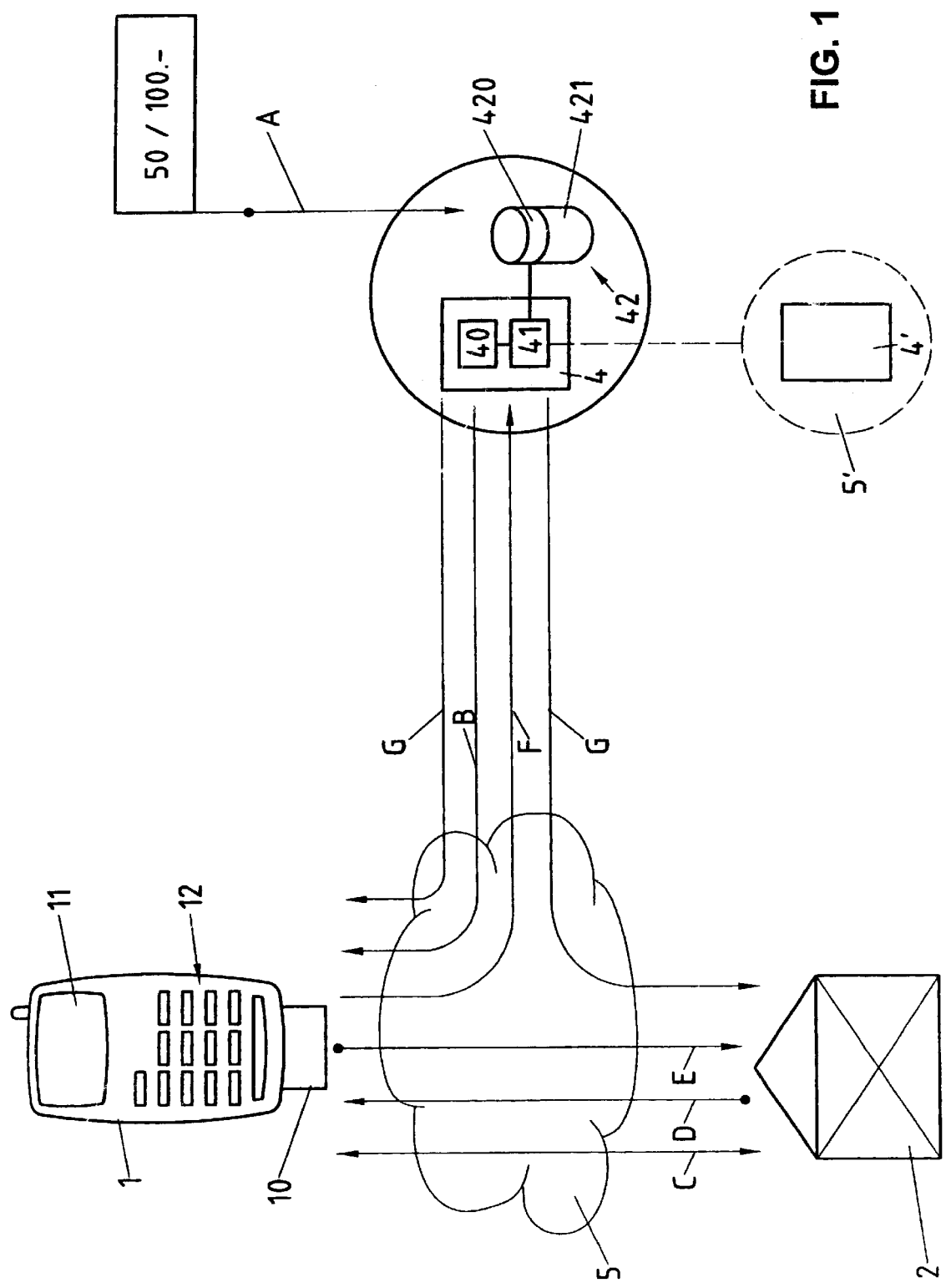

At least certain order data, in which at least a monetary amount is indicated, are packed in one or more SMS or USSD or e-mail short messages, and are transmitted to a validation platform connected to a short message service center. The indicated monetary amount is deducted from a monetary account of the customer and is transferred to a monetary account of the services provider.

21 Claims, 1 Drawing Sheet

TRANSACTION METHOD

This invention relates to a method of ordering and paying for goods or services with a mobile radio telephone, in particular with a GSM (Global System for Mobile Communications) or UMTS (Universal Mobile Telephone System) mobile radio telephone.

The present invention can be used for the following applications, respectively for ordering and paying for the following goods or services:

groceries, department store articles, public transportation, other passenger transportation (taxi), hotel rooms, admission ticket sales, public communications services, internet, online services, news, information, radio and digital audio broadcasting (DAB) programs, downloaded computer programs, pay TV, and much more.

Various methods are already known for ordering and paying for goods or services. With cash there is hardly any security against fraud or theft; moreover, finding the right change is often difficult. Payment cards therefore (so-called plastic money) are being accepted more and more. These cards can be classified into three types: value cards (for example, telephone cards or so-called e-cash cards), debit cards and credit cards. Value cards with a chip are handy, but can be stolen, however, and used by the thief. They are not personal, and usually cannot be blocked. Therefore they do not offer a lot of security for the customer, nor for the services provider. Credit cards and debit cards are assigned to a particular person, and result in a subsequent charge to an account, which is why they are also called identification or charge cards. With these cards the sale of goods always takes place before payment for the goods. With debit cards, each individual transaction is charged without delay; with credit cards, all transactions for a month are added together and are charged at the end of the month.

Value cards, credit cards and debit cards can only be used at businesses having the corresponding dealer terminal. However, many points of sale, for example most kiosks, parking lots, cinemas, etc., have no suitable dealer terminal. Moreover different terminals are often required for different cards of different financial institutions. Thus it is not possible at the present time to carry out transactions using payment cards at all points of sale, in particular not at points of sale which are not equipped with a suitable terminal.

One object of the invention therefore is an electronic transaction method which can be used for as many services providers as possible.

According to the invention, this object is achieved through a transaction method for ordering goods or services by mobile telephone, a delivery order from a customer being transmitted directly to a services provider via a mobile radio network, wherein at least certain order data, in which at least a monetary amount is indicated, are packed in one or more short messages and are transmitted to a validation platform connected to a short message service center, the indicated monetary amount is deducted from a monetary account of the customer and is transferred to a monetary account of the services provider.

The present invention will be better understood with the aid of the specification, given by way of example, and illustrated by the single appended figure, which is a block diagram showing the flow of information in a telecommunications system according to the invention.

Described in the following, with the aid of the figure, will be the flow of information in a telecommunications system according to the invention. The customer is equipped with a mobile radio telephone 1, which contains a SIM (Subscriber Identification Module) card 10 that identifies him in a mobile radio network 5, for example a GSM or UMTS network. The services provider 2 needs a terminal (not shown) with a data link to a short message service center (SMSC) 41; the terminal can consist of a GSM or UMTS device, for example. The system according to the invention comprises a multiplicity of services providers, for example some hundred or some thousand services providers, and a larger number of (potential) customers, for example some million customers. Customers and services providers all have concluded an agreement with the operator of the validation platform 42, who can also be the operator of the mobile radio network 5, for example. The mobile radio network 5 further comprises a GSM Mobile Switching Center (MSC) 40, connected to the short message service center. The short message service center 41 is preferably designed as a SICAP platform, as described in the European patent No. 0 689 368 in the name of the present applicant. Another type of short message service center 41, which can receive and process other types of short messages, for example USSD (Unstructured Supplementary Services Data) messages or e-mails, can also be used within the framework of this invention, however.

The short message services center 41 executes an application 42, for example a SICAP application, in order to carry out the method according to the invention. The application 42 can be executed on the same computer as the short message services center 41, or on another computer which is logically connected to this center 41. It comprises a validation program 420 for validating orders as well as a customer data base 421. The application 42 is therefore referred to as the "validation platform" in the following, regardless of whether it involves a specially programmed computer or a computer program in the center 41. The validation platform 42 can be operated by the operator of the short message service center 41 or by another organization, for example by a financial institution; it is independent from the services provider 2, however, and is not operated by him. There can also be a plurality of validation platforms in a mobile radio network 5 or even in a single short message service center 41.

To order a product or a service from a services provider 2, the customer must set up a monetary account in the customer data base 421. The account can be administered by any financial institution. Via cash payment, transfer from another account, purchase of value cards and validation in the account, etc., the customer can pay a desired sum in a particular currency onto the monetary account (arrow A). The paid-in sum is credited to the respective monetary account in the validation platform 421. By means of a short message, the paid-in sum is transmitted to the SIM card 10 (arrow B) and is stored in a memory area of this card which cannot be changed by the customer. The monetary sum is also preferably displayed on the display 11 of the mobile radio telephone 1. The short message B can be, for example, a SMS (Short Message System) or a USSD (Unstructured Supplementary Services Data) message. If the SIM card 10 is suitable for WAP (Wireless Application Protocol), the short message can also be an e-mail. The short message is preferably electronically signed, encrypted, and authenticated by the validation platform 42, preferably according to the TTP (Trusted Third Party) protocol.

The customer must then dial the call number of the desired services provider 2 to order a product or a service from this provider. By means of a short message (SMS, USSD, e-mail or fax), which can be entered, for example, with the input keys 12 of the mobile radio telephone, or orally, he can make an order for delivery from this services provider (arrow C). A copy of this order is preferably sent to the validation platform 42 (either by the customer or by the services provider).

The customer is then informed about the price for the requested service or product orally or via a short message (SMS, USSD or e-mail) (arrow D). This communication is preferably prepared automatically by a suitable system at the services provider; it can also contain other information from the services provider, for example about the availability of the product, delivery time, conditions, etc. A copy of this communication is preferably sent to the validation platform 42 via the mobile radio network 5.

If he agrees with the price and the conditions, the customer can confirm the order with a short message (SMS, USSD or e-mail) (arrow E). The confirmation preferably contains all order data needed for the order, inter alia an identification of the customer (for example the IMSI, International Mobile Subscriber Identity, which is stored in a secured memory area of the SIM card 10), of the services provider and of the product ordered, the agreed-upon price, the quantity ordered, the delivery address, etc. A copy of the confirmation short message is automatically communicated to the validation platform 42 either by the customer or by the services provider (arrow F). The copy is prepared either by a corresponding program, a secured area of the SIM card 10, or by the terminal of the services provider. A password for the confirmation can be requested through a suitable application in the SIM card 10 of the customer. In addition, the confirmation is preferably electronically signed by the customer, is encrypted and authenticated, preferably according to TTP protocol, preferably with a program and an electronic key, which are stored in the SIM card 10.

In a variant, in order to protect the private sphere of the customer, the copy of the confirmation message for the validation platform 42 contains only the data which are necessary for the monetary transaction (identification of the customer, of the services provider and amount), but no data concerning the purchased service, product or information.

The validation platform 42 then receives the confirmation short message, and decrypts it (if necessary). The data are preferably decrypted by the validation platform 42, and not by the short message service center (end-to-end encryption). This way the transmitted order data are kept confidential also with respect to the operator of the center 41 (if this operator does not operate the validation platform as well). The electronic signature is also checked, if applicable. If these tests are passed, the platform 42 checks whether the order can be accepted from the viewpoint of creditworthiness. For example, the solvency of the customer is checked and whether the sum on the monetary account of the identified customer suffices for the amount of the order. In addition, a black list is preferably checked in the validation platform; if the customer is entered in the black list, the order is not accepted, or the customer is told to contact the operator of the validation platform 42.

The validation platform 42 knows the identification of the services provider and the amount. Therefore it can establish the account of the services provider to be credited. It knows the identity of the customer from the customer identification (and if applicable, the PIN). Therefore it can also establish the customer account to be debited. If all the tests have been passed, the requested amount is deducted in the validation platform from the respective account, and is transferred to the account of the services provider. The account with the services provider can be stored either by the services provider, by the customer or in a data base in the validation platform 42. The account can also be administered by another financial institution. In this case, a communication between the validation platform 42 and the external financial institution is prepared. The customer 1 and the services provider both receive an automatically prepared, corresponding report (arrow G), for example an oral confirmation or a short message (SMS, USSD, e-mail or fax). This short message preferably also contains an indication of the new balance of the account of the customer, respectively of the services provider (if the account of the services provider is also operated by the validation platform). The monetary amount stored in the SIM card 10 is accordingly adjusted automatically by a corresponding program.

If the ordered service is a request for information, the customer preferably receives this information directly on his mobile device, for example as spoken information from a speech server of the services provider 2, or by means of a short message (SMS, USSD, e-mail, DAB-program-accompanying messages, etc.), which are shown directly on the display 11 and/or carried out by a corresponding application in the SIM card. If the ordered item is a product, this product is delivered to the requested place. The delivery address can be part of the order data, for example, or can be derived from the IMSI of the calling customer.

One skilled in the art will understand that the ordering method according to the invention is also suitable for orders abroad. In this case the different messages destined for the validation platform 42 are further transmitted to another short message service center 4' in the corresponding public mobile radio network 5' (VPLMN—Visited Public Land Managed Network) by means of normal roaming procedures.

What is claimed is:

1. A transaction method for ordering goods or services using a mobile telephone by transmitting a delivery order from a customer to a services provider via a mobile telephone network, comprising:

transmitting the delivery order directly to the services provider without the delivery order being processed for content by a validation platform connected to a short message service center;

transmitting at least certain order data entered by said services provider, which data entered comprise at least an indication of a monetary amount, with short messages to the mobile radio telephone of the customer and displaying said short messages on said mobile radio telephone;

packing at least certain order data, which are copied from said delivery order or from a confirmation thereof, and which comprise at least said monetary amount, in one or more short messages and sending said short messages to the validation platform; and deducting said monetary amount in the validation platform from a monetary account to be customer and transferring said monetary amount to a monetary account of said service provider, wherein the customer is unambiguously identified on the basis of a call number assigned to a subscriber identification module of the mobile radio telephone.

2. The transaction method according to claim 1, wherein the short messages are SMS messages.

3. The transaction method according to claim 1, wherein the said short messages are USSD messages.

4. The transaction method according to claim 1, wherein the mobile radio telephone is WAP capable, and the said short messages are e-mails.

5. The transaction method according to claim 1, further comprising electronically signing the said short messages by the customer.

6. The transaction method according to claim 1, further comprising said validation platform sending a confirmation to the customer and/or to the services provider.

7. The transaction method according to claim 1, wherein the order data comprise a services provider identification.

8. The transaction method according to claim 1, further comprising the customer entering at least certain transaction data using input means of the mobile radio telephone.

9. The transaction method according to claim 1, further comprising obtaining at least certain transaction data entered by the customer from a memory area of a SIM card of the mobile radio telephone.

10. The transaction method according to claim 9, wherein the order data obtained from said memory area comprise at least the customer identification.

11. The transaction method according to claim 10, wherein the said customer identification is the IMSI.

12. The transaction method according to claim 1, further comprising storing a balance of the monetary account of the customer in the validation platform in a memory area of the SIM card of the customer.

13. The transaction method according to claim 12, further comprising updating the balance of the account stored in the SIM card by the validation platform at the end of the transaction method.

14. The transaction method according to claim 1, further comprising transmitting information in response to the delivery order that is an information inquiry via the mobile radio network to the mobile radio telephone of the customer.

15. The transaction method according to claim 14, further comprising synthesizing said information with a speech server and transmitting said information to the customer via the user information channel.

16. The transaction method according to claim 14, wherein said information is transmitted by means of short messages.

17. The transaction method according to claim 14, wherein said information is transmitted by means of e-mail.

18. The transaction method according to one of the claim 16 or 17, wherein the said information comprises a computer program.

19. The transaction method according to claim 1, further comprising encrypting at least certain order data over the entire route between the customer and the validation platform.

20. The transaction method according to claim 1, further comprising sending the order data to a plurality of validation platforms.

21. The transaction method according to claim 1, further comprising sending the order data to validation platforms in other countries.

* * * * *

UNITED STATES PATENT AND TRADEMARK OFFICE
CERTIFICATE OF CORRECTION

PATENT NO. : 6,415,156 B1
DATED : July 2, 2002
INVENTOR(S) : Stadelmann

It is certified that error appears in the above-identified patent and that said Letters Patent is hereby corrected as shown below:

Title page,
Item [73], Assignee, please change "Swisscom AG, Bern (CH)" to -- Swisscom Mobile AG, Bern (CH) --.

Signed and Sealed this

Twentieth Day of May, 2003

JAMES E. ROGAN
*Director of the United States Patent and Trademark Office*